(12) United States Patent
Hertel et al.

(10) Patent No.: US 11,368,557 B2
(45) Date of Patent: *Jun. 21, 2022

(54) PLATFORM FOR CONSTRUCTING AND CONSUMING REALM AND OBJECT FEATURE CLOUDS

(71) Applicants: Alexander Hertel, Sunnyvale, CA (US); Philipp Hertel, Belmont, CA (US)

(72) Inventors: Alexander Hertel, Sunnyvale, CA (US); Philipp Hertel, Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,557

(22) Filed: Jun. 8, 2020

(65) Prior Publication Data

US 2020/0329125 A1 Oct. 15, 2020

Related U.S. Application Data

(63) Continuation of application No. 15/661,247, filed on Jul. 27, 2017, now Pat. No. 10,681,183, which is a
(Continued)

(51) Int. Cl.
*H04L 29/06* (2006.01)
*H04L 67/01* (2022.01)
(Continued)

(52) U.S. Cl.
CPC .............. *H04L 67/42* (2013.01); *G06F 16/29* (2019.01); *G06F 16/583* (2019.01)

(58) Field of Classification Search
CPC ......... H04L 67/42; G06F 16/583; G06F 16/29
(Continued)

(56) References Cited

U.S. PATENT DOCUMENTS 5,850,352 A 12/1998 Moezzi et al.
6,295,502 B1 9/2001 Hancock et al.
(Continued)

FOREIGN PATENT DOCUMENTS

CN 102289784 A 12/2011
CN 105547151 A 5/2016
(Continued)

OTHER PUBLICATIONS

Agarwal et al., "From Point Cloud to Grid DEM: A Scalable Approach," Department of Computer Science, Duke University and Department of Computer Science, University of Aarhus, pp. 1-15, date unknown.
(Continued)

*Primary Examiner* — Moustafa M Meky
*Assistant Examiner* — Elizabeth Kassa
(74) *Attorney, Agent, or Firm* — Sunstein LLP

(57) ABSTRACT

A computer-implemented method of providing a server-based feature cloud model of a realm includes receiving by a server a series of digital contributions that collectively originate from a plurality of remote computing devices, characterizing portions of the realm. The method also includes processing by the server the received digital contributions to associate them with a global coordinate system and storing the processed contributions in a realm model database as components of the feature cloud model of the realm. Finally, the method includes, in response to a query message over the Internet from a computing device of an end-user, serving, over the Internet by the server to the computing device, digital data defining a selected portion of the feature cloud model for integration and display by the computing device.

11 Claims, 7 Drawing Sheets

Related U.S. Application Data continuation of application No. 14/289,103, filed on May 28, 2014, now Pat. No. 9,723,109.

(51) Int. Cl.
*G06F 16/29* (2019.01)
*G06F 16/583* (2019.01)

(58) Field of Classification Search
USPC .......................................................... 709/203
See application file for complete search history.

(56) References Cited

U.S. PATENT DOCUMENTS

| | | | |
|---|---|---|---|
| 6,330,356 | B1 | 12/2001 | Sundareswaran et al. |
| 6,437,805 | B1 | 8/2002 | Sojoodi et al. |
| 6,564,246 | B1 | 5/2003 | Varma et al. |
| 8,117,281 | B2 | 2/2012 | Robinson et al. |
| 8,234,218 | B2 | 7/2012 | Robinson et al. |
| 8,316,450 | B2 | 11/2012 | Robinson et al. |
| 8,515,875 | B1 | 8/2013 | Murray |
| 8,525,829 | B2 * | 9/2013 | Smithwick ........... H04N 13/305 345/419 |
| 8,635,519 | B2 | 1/2014 | Everingham et al. |
| 9,070,216 | B2 | 6/2015 | Golparvar-Fard et al. |
| 9,122,368 | B2 | 9/2015 | Szeliski et al. |
| 9,218,609 | B2 | 12/2015 | Hertel et al. |
| 9,367,870 | B2 | 6/2016 | Klein et al. |
| 9,495,760 | B2 | 11/2016 | Swaminathan et al. |
| 9,529,826 | B2 | 12/2016 | Harp et al. |
| 9,539,498 | B1 | 1/2017 | Hanke et al. |
| 9,554,123 | B2 | 1/2017 | Rhoads |
| 9,582,516 | B2 | 2/2017 | McKinnon et al. |
| 9,669,296 | B1 | 6/2017 | Hibbert et al. |
| 9,706,350 | B2 | 7/2017 | Ling |
| 9,721,386 | B1 | 8/2017 | Worley, III et al. |
| 9,886,720 | B2 | 2/2018 | Hertel et al. |
| 10,026,230 | B2 | 7/2018 | Kim |
| 10,042,862 | B2 | 8/2018 | Gorman et al. |
| 10,083,186 | B2 | 9/2018 | Har-Noy et al. |
| 10,203,762 | B2 | 2/2019 | Bradski et al. |
| 10,380,646 | B2 | 8/2019 | Hertel et al. |
| 10,554,872 | B2 | 2/2020 | Fan et al. |
| 10,769,680 | B2 | 9/2020 | Hertel et al. |
| 10,846,937 | B2 | 11/2020 | Rogers et al. |
| 2002/0095333 | A1 | 7/2002 | Jokinen et al. |
| 2003/0058242 | A1 | 3/2003 | Redlich |
| 2007/0078883 | A1 | 4/2007 | Hayashi et al. |
| 2008/0082264 | A1 | 4/2008 | Hill |
| 2008/0163379 | A1 * | 7/2008 | Robinson ............ G06F 3/04815 726/27 |
| 2008/0307311 | A1 | 12/2008 | Eyal |
| 2009/0249244 | A1 | 10/2009 | Robinson et al. |
| 2010/0042382 | A1 | 2/2010 | Marsh |
| 2010/0114661 | A1 | 5/2010 | Aderfer et al. |
| 2010/0211880 | A1 | 8/2010 | Haggar et al. |
| 2010/0257252 | A1 | 10/2010 | Dougherty et al. |
| 2010/0302056 | A1 | 12/2010 | Dutton et al. |
| 2010/0309225 | A1 | 12/2010 | Gray et al. |
| 2011/0224902 | A1 | 9/2011 | Oi |
| 2011/0310227 | A1 | 12/2011 | Konertz et al. |
| 2012/0075342 | A1 | 3/2012 | Choubassi et al. |
| 2012/0092327 | A1 | 4/2012 | Adhikari |
| 2012/0162255 | A1 | 6/2012 | Ganapathy et al. |
| 2012/0166260 | A1 | 6/2012 | Steelberg et al. |
| 2012/0176516 | A1 | 7/2012 | Elmekies |
| 2012/0183172 | A1 | 7/2012 | Stroila |
| 2012/0214590 | A1 | 8/2012 | Newhouse et al. |
| 2012/0249544 | A1 | 10/2012 | Maciocci et al. |
| 2013/0125027 | A1 | 5/2013 | Abovitz |
| 2013/0187952 | A1 | 7/2013 | Berkovich et al. |
| 2013/0208007 | A1 | 8/2013 | Kubo et al. |
| 2013/0217333 | A1 | 8/2013 | Sprigg et al. |
| 2013/0218561 | A1 | 8/2013 | Naimark |
| 2013/0222369 | A1 | 8/2013 | Huston |
| 2013/0321461 | A1 | 12/2013 | Filip |
| 2014/0125651 | A1 | 5/2014 | Sharp et al. |
| 2014/0320593 | A1 | 10/2014 | Pirchheim et al. |
| 2014/0358666 | A1 | 12/2014 | Baghaie et al. |
| 2014/0369595 | A1 | 12/2014 | Pavlidis et al. |
| 2015/0009206 | A1 * | 1/2015 | Arendash ............. G06T 19/006 345/419 |
| 2015/0016712 | A1 | 1/2015 | Rhoads et al. |
| 2015/0062120 | A1 | 3/2015 | Reisner-Kollmann et al. |
| 2015/0091891 | A1 * | 4/2015 | Raheman ................ G06F 3/017 345/419 |
| 2015/0109338 | A1 | 4/2015 | McKinnon et al. |
| 2015/0172626 | A1 | 6/2015 | Martini |
| 2015/0193982 | A1 | 7/2015 | Mihelich et al. |
| 2015/0310669 | A1 | 10/2015 | Kamat et al. |
| 2015/0339324 | A1 | 11/2015 | Westmoreland et al. |
| 2016/0148433 | A1 | 5/2016 | Petrovskaya et al. |
| 2016/0342318 | A1 | 11/2016 | Melchner et al. |
| 2017/0034586 | A1 | 2/2017 | Melchner et al. |
| 2017/0228942 | A1 | 8/2017 | Arsan et al. |
| 2018/0211399 | A1 | 7/2018 | Lee et al. |
| 2020/0410554 | A1 | 12/2020 | Hertel et al. |

FOREIGN PATENT DOCUMENTS

| | | |
|---|---|---|
| EP | 2372582 A1 | 10/2011 |
| EP | 2611127 A1 | 7/2013 |
| EP | 2695129 A2 | 2/2014 |
| EP | 2940624 A1 | 11/2015 |
| EP | 2407910 B1 | 9/2018 |
| KR | 10-1260425 | 5/2013 |
| WO | WO 2012/109188 A1 | 8/2012 |
| WO | WO 2012/138784 A2 | 10/2012 |
| WO | WO 2013/122536 A1 | 8/2013 |
| WO | WO 2014/012444 A1 | 1/2014 |
| WO | WO 2015/160713 A2 | 10/2015 |
| WO | WO 2016/103115 A1 | 6/2016 |
| WO | WO 2017/066275 A1 | 4/2017 |
| WO | WO 2017/212484 A1 | 12/2017 |
| WO | WO 2019/016820 A1 | 1/2019 |

OTHER PUBLICATIONS

Brilakis et al., "Progressive 3D reconstruction of infrastructure with videogrammetry," Google Patents, 2 pages, 2011, retrieved from the Internet on Apr. 5, 2019 https://patents.google.com/scholar/4482122932006126723?q=feature&q=cloud&q=model%.

Hammoudi et al., "Extracting Wire-Frame Models of Street Facades from 3D Point Clouds and the Corresponding Cadastral Map," IAPRS, vol. XXXVIII, Part 3A, pp. 91-96, Sep. 1-3, 2010.

Lee et al., "Immersive authoring: What You eXperience Is What You Get (WYXIWYG)," Communications of the ACM, vol. 48, No. 7, pp. 76-81, Jul. 2005.

Leonard et al., "Simultaneous map building and localization for an autonomous mobile robot," IEEE Digital Library, 1 page, Nov. 3-5, 1991, retrieved from the Internet on Apr. 5, 2019 https://ieeexplore.ieeee.org/document/174711.

Levoy et al., "The Use of Points as a Display Primitive," Technical Report 85-022, Computer Science Department, University of North Carolina at Chapel Hill, 1 page, Jan. 1985, retrieved from the Internet on Apr. 5, 2019 http://graphics.stanford.edu/papers/points/.

PCT Inc., Vuforia Engine Release Notes, PTC Inc., 99 pages, 2011-2018, retrieved from the Internet on Apr. 5, 2019 https://library.vuforia.com/articles/Release_Notes/Vuforia-SDK-Release-Notes.

Pucihar et al., "Exploring the Evolution of Mobile Augmented Reality for Future Entertainment Systems," Research Gate, 28 pages, 2019, retrieved from the Internet on Apr. 5, 2019 https://www.researchgate.net/publication/272362062_Exploring_the_Evolution_of_Mobile.

Reisner-Kollmann, "Reconstruction of 3D Models from Images and Point Clouds with Shape Primitives," Dissertation to the Faculty of Informatics at the Vienna University of Technology, 108 pages, Feb. 18, 2013.

(56) References Cited

OTHER PUBLICATIONS

Rusinkiewicz et al., "QSplat: a multresolution point rendering system for large meshes," ACM Digital Library, 2 pages, 2000, retrieved from the Internet on Apr. 5, 2019 https://dl.acm.org/citation.cfm?doid=344779.344940.

Springer Nature, "Augmented Reality 2.0," Springer Nature Switzerland AG., 15 pages, 2018, retrieved from the Internet on Apr. 5, 2019 https://link.springer.com/chapter/10.1007%2F978-3-211-99178-7_2.

Uematsu et al., "Balog: Location-based information aggregation system," Yokohama National University and National Institute of Informatics, 2 pages, date unknown.

Wang et al., "Simultaneous Localization, Mapping and Moving Object Tracking," Department of Computer Science and Information Engineering and Graduate Institute of Networking and Multimedia National Taiwan University, 47 pages, date unknown.

Zou et al., "CoSLAM: Collaborative Visual SLAM in Dynamic Environments," Journal of Latex Class Files, vol. X, No. X, pp. 1-15, Jan. 20XX.

Castro et al., "Multi-robot SLAM on Client-Server Architecture", Brazilian Robotics Symposium and Latin American Robotics Symposium, pp. 196-201, Oct. 16, 2012.

Ventura et al., "Global Localization from Monocular SLAM on a Mobile Phone", IEEE Transactions on Visualization and Computer Graphics, vol. 20, No. 4, pp. 531-539, Apr. 1, 2014.

International Searching Authority, International Search Report—International Application No. PCT/US2015/032676 dated Aug. 27, 2015, together with the Written Opinion of the International Searching Authority, 12 pages.

International Searching Authority, International Search Report—International Application No. PCT/US2015/025592 dated Dec. 1, 2015, together with the Written Opinion of the International Searching Authority, 15 pages.

International Searching Authority, International Search Report—International Application No. PCT/US2016/056577 dated Jan. 24, 2017, together with the Written Opinion of the International Searching Authority, 12 pages.

Tanenbaum et al., "Distributed Systems: Principles and Paradigms (2nd Edition)", Oct. 12, 2006, 87 pages.

Windley, "The Live Web: Building Event-Based Connections in the Cloud", Dec. 21, 2011, Course Technology PTR, 18 pages.

* cited by examiner

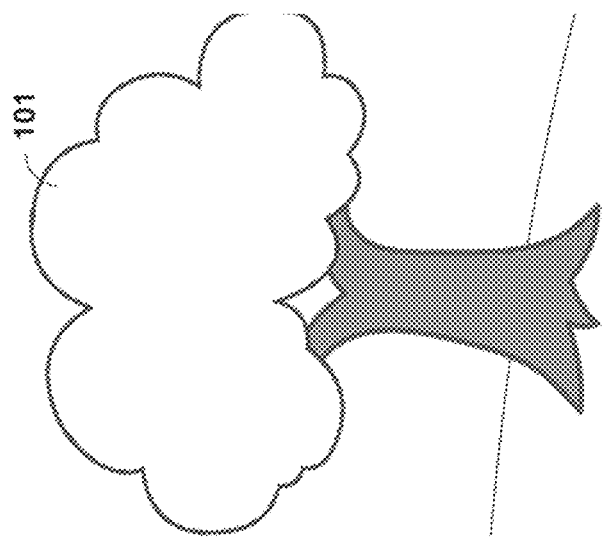
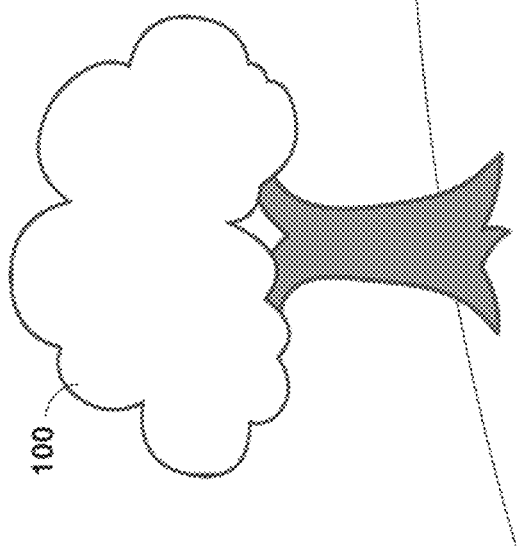
Fig. 02

PLATFORM FOR CONSTRUCTING AND CONSUMING REALM AND OBJECT FEATURE CLOUDS

RELATED APPLICATIONS

This application is a continuation application of and claims priority to U.S. application Ser. No. 15/661,247, entitled "Platform for Constructing and Consuming Realm and Object Feature Clouds," filed on Jul. 27, 2017, and issuing on Jun. 9, 2020 as U.S. Pat. No. 10,681,183, which itself is a continuation application of and claims priority to U.S. application Ser. No. 14/289,103, entitled "Platform for Constructing and Consuming Realm and Object Feature Clouds," filed on May 28, 2014, and issued on Aug. 1, 2017 as U.S. Pat. No. 9,723,109, all of which are incorporated herein by reference in their entirety.

TECHNICAL FIELD

The present invention relates to the area of server-based software services, and more particularly to computer-implemented methods for providing location identification services as well as augmented reality functionality and branded experiences in relation to usage of computer devices such as mobile smart phones.

BACKGROUND ART

Since the presently described invention touches on several fields, it is useful to discuss prior art in these separate areas.

Google and other companies such as Apple, Microsoft, and MapQuest have built mapping services which are based on a combination of tile servers as well as vector graphics. Google has integrated its mapping services with its "Street View" fleet of cars with cameras on the roofs in order to create a further ground-level view of the world's streets.

The use of SLAM mapping for the purposes of augmented reality was pioneered by a company called $13^{th}$ Lab in Scandinavia.

Microsoft Live Labs created a product called Photosynth capable of building point clouds of physical scenes from a series of photographs.

SUMMARY OF THE EMBODIMENTS

In a first embodiment of the invention there is provided a computer-implemented method of providing a server-based feature cloud model of a realm. The method of this embodiment includes:
  receiving by a server a series of digital contributions that collectively originate from a plurality of remote computing devices, each digital contribution characterizing a defined and distinct three-dimensional volume of the realm, wherein each distinct three-dimensional volume includes a portion that does not overlap any other three-dimensional volume;
  processing by the server of each one of the received digital contributions to associate such contribution with a global coordinate system; and
  storing and integrating each of the processed contributions in a realm model database so as to provide the feature cloud model of the realm stored on the server.
Optionally, the contributions are in the form of feature clouds. Alternatively or in addition, the contributions are in a form other than feature clouds, and processing by the server includes converting the contributions to feature clouds. Also alternatively or in addition, the method further includes
  receiving a set of brand-based digital contributions of brand-based content for integration into the feature cloud model; and
  processing the received brand-based contributions to associate them with the global coordinate system and storing and integrating each of the processed brand-based contributions in the realm model database so as to provide the feature cloud model of the realm stored on the server, so that one of the brand-based contributions can be experienced by an end-user, if the end-user is affiliated with the brand and if the brand-based contribution is located in the selected portion of the model.

In another related embodiment, an object database is coupled to the server, and the method further includes storing, by the server, an association between a subset of feature cloud data in the feature cloud model of the realm and a selected one of the objects in the object database. Optionally, the method further includes causing, by the server, the subset to be presented as part of a displayed view of a part of the feature cloud model of the realm, wherein the subset is identified using the association. Optionally, the method, further includes, before storing the association, processing by the server of the subset of feature cloud data to determine the association.

In another related embodiment, receiving by the server the series of digital contributions includes receiving a digital contribution from a given one of the remote computing devices in which the subset of feature cloud data is a part and is identified by the given computing device as a candidate for object processing and the method further comprises, before storing the association, processing by the server of the subset of feature cloud data to determine the association.

In yet another related embodiment, the method further includes:
  receiving by the server a digital data set, wherein the digital data set contains object data, from a selected remote computing device;
  processing by the server the digital data set into a processed digital data set that is in a format compatible with the feature cloud model of the realm so as to facilitate a matching process;
  matching by the server, in the matching process, the processed digital data set with feature cloud data already stored in the feature cloud model of the realm to recognize an object encoded by the object data as corresponding to the selected one of the objects in the object database;
  retrieving the association between the selected one of the objects in the object database and a subset of the realm model corresponding to the object encoded by the processed digital data set; and
  transmitting to the selected remote computing device an identification of the association.
In further related embodiments, the realm is a domain.

BRIEF DESCRIPTION OF THE DRAWINGS

The foregoing features of embodiments will be more readily understood by reference to the following detailed description, taken with reference to the accompanying drawings, in which:

FIGS. 2-4 similarly illustrate the end-user experience of interacting with the SLAM-Map system of FIG. 1 to consume a SLAM-Map Fabric.

DETAILED DESCRIPTION OF SPECIFIC EMBODIMENTS

Figure 1:
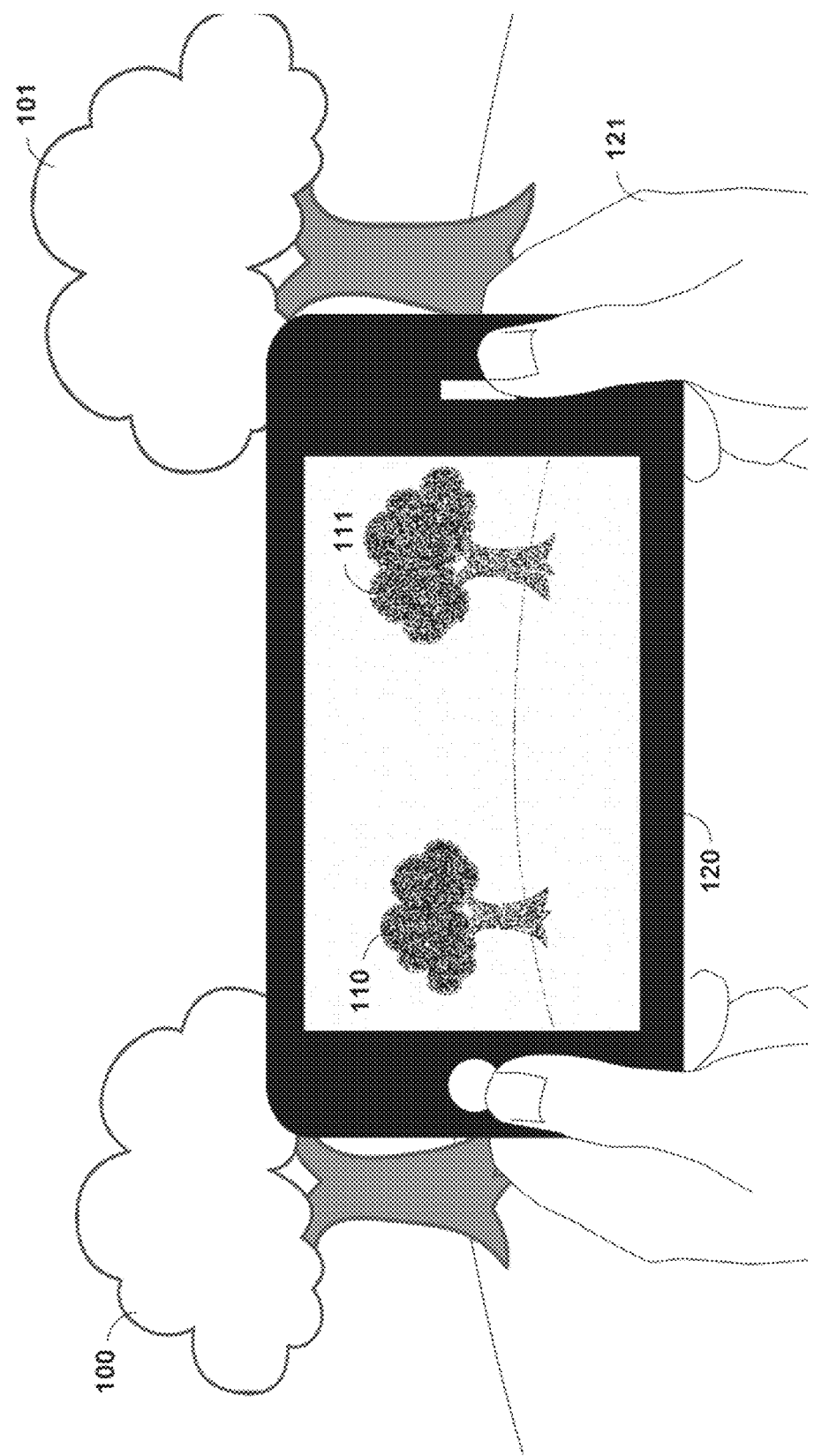
FIG. 1 illustrates the end-user experience of SLAM-Map creation and includes a representation of a display presenting a mobile user interface for that purpose, in accordance with an embodiment of the present invention.

Definitions. As used in this description and the accompanying claims, the following terms shall have the meanings indicated, unless the context otherwise requires:

A "server" includes a hardware-implemented server, a cluster of computers configured to operate as a hardware-implemented server, and a set of logical processes configured to perform functions associated with a hardware-implemented server.

A "set" includes at least one member.

A "brand" is a trademark or an affinity group.

An "affinity group" is a grouping of individuals having a shared interest, which may, for example, be (1) an interest in goods or services from a particular source, which in turn may be identified by a trademark, (2) an interest in celebrating the birthday of a particular child, or (3) an interest in a program of a school in rewarding performance or participation by students in some activity, such as a spelling bee, an athletic competition, academic achievement, etc.

An "end-user" is a consumer using any device which is consuming any service provided by the embodiment of the present system by a brand.

A "realm" is a geographic area that is sufficiently large that it cannot be fully captured in a single camera view and that may be sufficiently large as to encompass the world.

A "domain" is a geographic region that is sufficiently large that it cannot be fully captured in 100 views and that may be sufficiently large as to encompass the world. A domain is always a realm, but not vice versa.

A "feature cloud" is a digital representation, created using machine vision, of a three-dimensional volume that is populated with a set of features derived from physical objects. A SLAM map is an example of a feature cloud.

An "object" is any shape that can be viewed, and includes a a natural geographical feature, such as a mountain or a rock, regardless of scale, an erected building or collection of buildings, or any other man-made item, regardless of scale, including an item of inventory on a shelf in store, etc.

"Object data" means data that characterizes the appearance of an object.

"Real-time" refers to a product interaction experience which occurs simultaneously, or near-simultaneously, to an end-user's actions or interactions with that product.

An "application" is a program that is written for deployment on a device running in its regular native mode.

A "device" is a machine or product, containing a CPU and memory that can execute programs. A "mobile device" is a device that is readily portable.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

In various embodiments, the presently-described invention is implemented by means of a specialized server that, in combination with a feature cloud model implemented by the server and services offered by the server in receiving contributions to the model and in serving data associated with the model, we call a "SLAM-Map Fabric". Its purpose is to provide a 3-D mapping service of the world which is considerably more accurate and faster than current GPS-based technology such as Google Maps, Apple Maps, Bing Maps, or MapQuest, and to classify 3-D objects within this map. SLAM is an acronym which stands for Simultaneous Localization And Mapping, and it was originally developed in the field of robotics and autonomous vehicles. SLAM allows an autonomous robot or vehicle to use its robotic "eyes" to build a three-dimensional map of an environment which it has never visited before, in effect giving it the ability to model new environments and locations in real time in order to avoid obstacles. This is done by processing feeds from cameras, radars, lidars, or other sensors to build a three-dimensional model of the robot's line-of-sight. In one embodiment, this 3-D model is constructed as a "feature cloud" which is created using computer vision technology based on parallax (stereoscopically or monoscopically over time) to capture "features" from the environment which are then modeled as sets of 3-D points. With enough points forming a feature cloud, it becomes simple to build and process a 3-D model of the immediate environment (for instance, it is easy to turn a point cloud into a 3-D triangle mesh, and then skin and shade it using standard 3-D libraries such as OpenGL), and this form of SLAM-mapping has found applications outside the field of robotics in areas such as augmented reality, where it can be used to accurately place virtual objects in the real world.

In various embodiments, we use standard SLAM-Mapping techniques in order to build feature clouds which can be "stitched together" to form our universal map of the world. The overall embodiment of the present invention includes this ability as a component, and can then use the virtual SLAM-Map Fabric in order to place objects or triggers in the real world via augmented reality. Similarly, it can also use the same technology to identify objects and products in the real world and to provide various subsequent services based on this information to end-users. A reader interested in learning more about SLAM technology is referred to "The SLAM Problem: A Survey", Josep Aulinas, Yvan Petillot, Joaquim Salvi, and Xavier Llado, University of Girona and University of Edinburgh, available at http://atc.edg.edu/~llado/CVpapers/ccia08b.pdf. This paper is hereby incorporated herein by reference in its entirety.

Since then, this SLAM technology has been adapted for augmented reality purposes in order to overlay virtual 3-D objects (videos, user interface, etc.) in the real-world space using a device such as a smart phone. This technology creates the illusion that a virtual object exists even though it doesn't. Our SLAM-Map Fabric makes use of this technology in a new way. Rather than building a dynamic map in real time, the embodiment of the present system will provide a service which is used to build a SLAM-Map of the world which can then be accessed by end-users. The idea is to create a service similar to GPS and Google Maps, except that instead of being GPS-based, this model of the world is SLAM-based. The construction of the system's SLAM-Map Fabric can be carried out in several different ways using client software on mobile devices. In the simplest manner, an individual carrying a mobile device which is running this software visits a location and uses the phone's camera to scan the physical features of the world. The SLAM-mapping software on the phone constructs a feature cloud or other 3-D model of every physical location which is scanned, and then uploads this data to the SLAM-Map Fabric's centralized server, together with the GPS coordinates of each area along with compass information. The GPS coordinates and compass data are used to create a rough estimate of where each modeled area is located, and how it is oriented. The individual creating the SLAM-Map need not necessarily be in the employ of the owner of the Fabric's server, but rather could be totally unaffiliated. Since the client software requires nothing more than a modern camera-enabled smart phone, by open-sourcing or otherwise distributing the client software used to build the SLAM-Map, the task of SLAM-Mapping the world could be crowd-sourced to thousands or even millions of volunteers, possibly even in the context of using a different service. Alternatively, instead of using smart phones carried by individuals on foot, the SLAM-mapping software could be deployed in cars with cameras built on top in the same way that Google currently uses its Street View cars to drive around, gathering data for Google Maps. All of these separate streams of SLAM-mapped data are gathered by the central server where they are stitched together to create a model of the world. This service can then be used by arbitrary parties to enable SLAM-mapped experiences for their end-users. In the presently-described embodiment, the SLAM-Map Fabric's central server carries out the additional orthogonal role of processing the 3-D map of the world using machine learning classifier algorithms in order to identify portions of the world's 3-D model as objects within the world. For instance, machine learning classifiers for trees, houses, cars, fire hydrants, streets, and other common objects in the world can label those subsets of the feature cloud as being members of those objects, thereby giving the SLAM-Map Fabric a certain semantic understanding of the 3-D world that it contains. A degenerate case of this involves using a SLAM-based Object Database rather than the SLAM-Map Database in order to identify individual items such as products.

The experience of building a SLAM-mapped scene is shown in FIG. 1, which illustrates the end-user experience of SLAM-Map creation and includes a representation of a display presenting a mobile user interface for that purpose, in accordance with an embodiment of the present invention. An end-user 121 visits a scene containing different physical objects 100, 101. The end-user launches the SLAM-mapping client application on his/her mobile device 120, which views the scene through the mobile device's camera lens, and builds a feature cloud 110, 111 or other 3-D model of the scene. Depending on the scene, the end-user may wish or need to walk around and view it from several different angles in order to construct a full model. Once this is done, it is then uploaded to the SLAM-Map Fabric server where it is integrated with the system's existing model and stored. As more independent contributors upload the same data set, it becomes more and more trusted because the same scene being viewed at different times will likely contain non-static objects such as parked cars or leaves on trees in different places, thereby allowing the system to more accurately differentiate between permanent and temporary fixtures.

Once a SLAM-mapped scene has been created, it can be used by administrators of the system as well as third parties such as brands to create new experiences for end-users. For instance, a scene could be used to create an augmented reality experience, in which a virtual object is placed in the virtual SLAM-mapped universe, and can then be seen in the real world through an end-user's phone when he/she visits that location. More specific to the embodiment of the presently-described system, another compelling use-case involves a type "trigger". A SLAM Trigger can be placed in the virtual SLAM-mapped world, and it fires when an end-user, interacting with this virtual world by means of his/her mobile device, comes within a certain distance of this trigger, SLAM Triggers are created by placing them into precise 3-D locations in the SLAM-Map Fabric using a graphical interface which allows for this virtual world to be explored on a computer. Once SLAM Triggers have been created, they function by causing arbitrary end-user-centric events to occur which have been programmed by the associated brand. In addition to these augmented reality experiences, the SLAM-Map Fabric has the ability to identify and classify the objects which it contains, making many more use-cases possible, such as the ability for end-users to point their camera-enabled mobile devices at certain objects, and to have the system identify the object in question and then respond with information or a list of possible actions.

Figure 3:
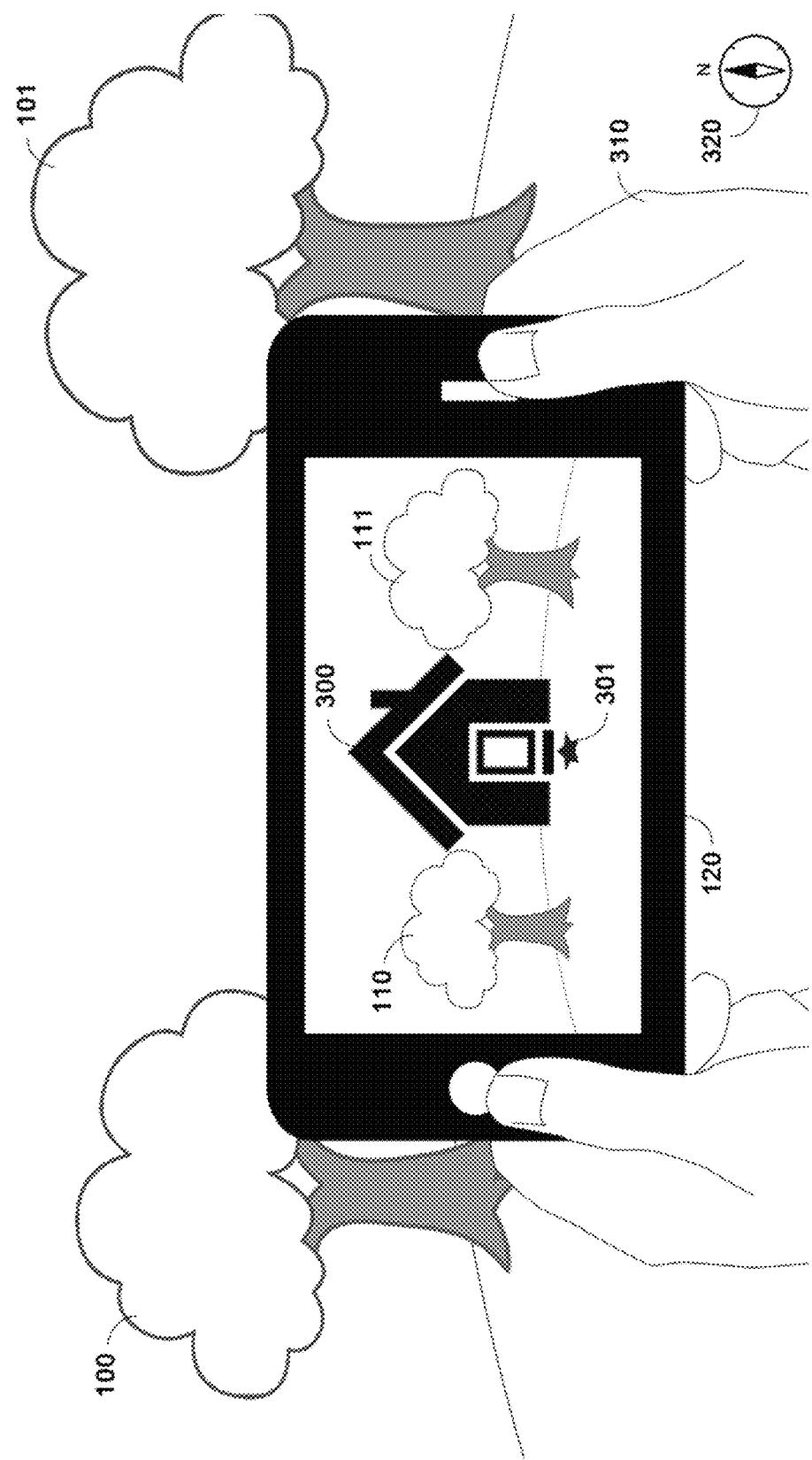
Figure 4:
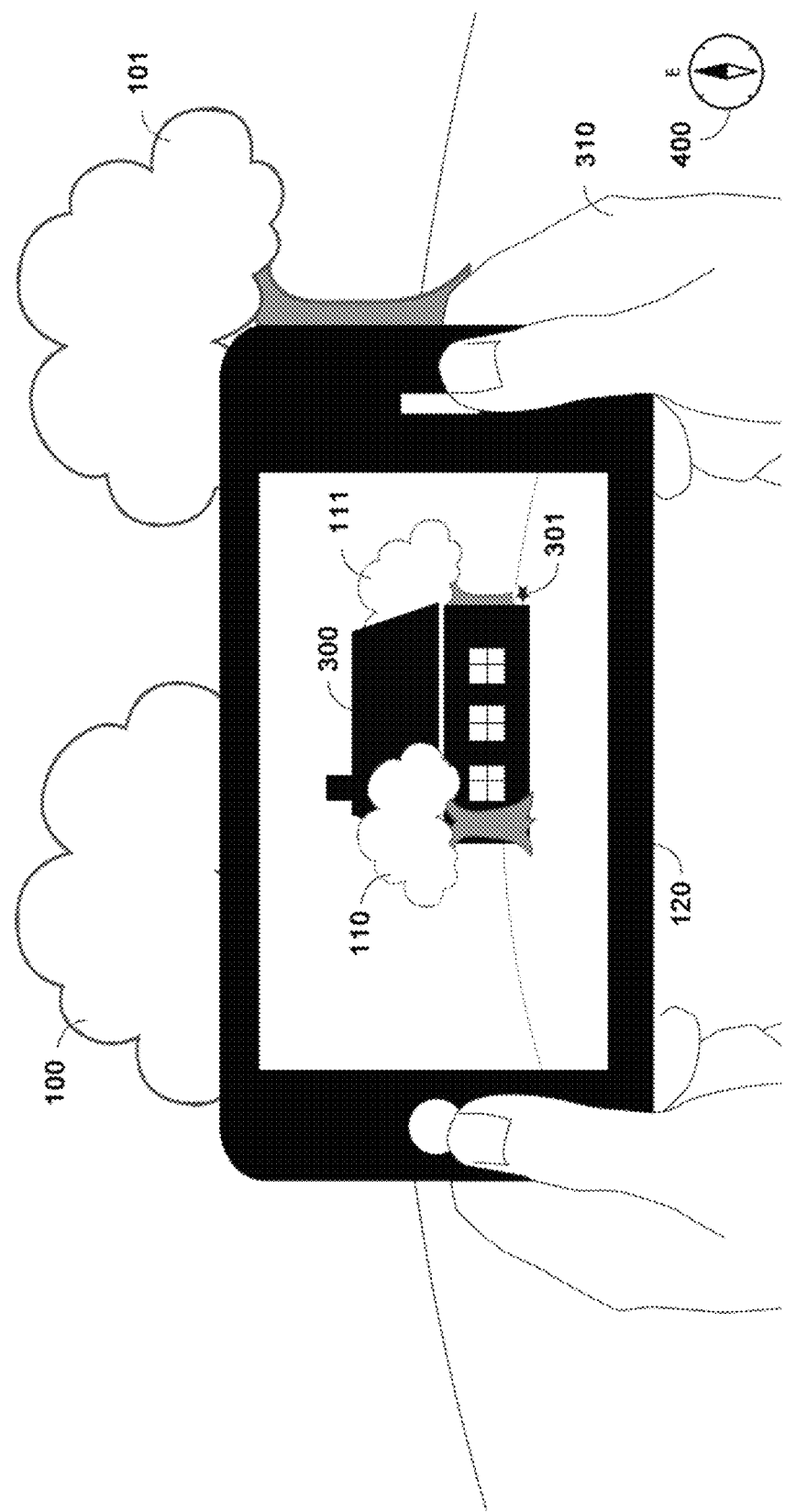

A typical end-user's experience interacting with the system's SLAM-Map Fabric is illustrated in FIGS. 2-4, which depict the end-user experience of interacting with the SLAM-Map System of FIG. 1 to consume a SLAM-Map Fabric. In FIG. 2, the end-user visits a physical location that has been previously SLAM-mapped by the present system. This location contains physical features 100, 101. In FIG. 3, the end-user 310 raises his/her mobile device 120 and launches an application which has implemented the system's SLAM-Mapping Fabric and other system features such as modules and triggers. Facing North 320, the end-user views the scene using his/her mobile device, which shows the camera feed on its screen. The scene seems normal to the end-user, but in the background, vision algorithms process it and dynamically build a SLAM-Map of the scene by turning the features 110, 111 into feature clouds or 3-D objects as was done previously using the client mapping software. The device sends this data (or some compressed form of it such as a hash) together with its current GPS coordinates and compass heading to the system, which uses these to narrow down the search, and then uses the accompanying data to determine if that scene exists in the system, and if it can identify any of the objects in the scene. In this case the scene does exist in the system, and it can identify the objects as trees, so the system finds a match and responds by sending an encoding of the scene along with identifying information for the trees as well as virtual objects near that location together with their exact coordinates relative to the scene. (Similarly, rather than sending models to the cloud to be matched, the system may proactively cache nearby SLAM-mapped objects as well as virtual objects may be dynamically cached and continuously updated on the device in order to improve response times.) In this case, those virtual objects include a 3-D house 300, and a SLAM Trigger 301, which are then overlaid on the end-user's screen in order to display an augmented reality experience. Augmented reality need not take the form of 3-D objects, but also might involve shaders and other graphical elements which could be applied to the environment as well as structures such as buildings in order to give them a new appearance such as what a city might look like in a post-apocalyptic era. Similarly, videos, or other interactive elements could be included in the scene. These 3-D objects, videos, and graphical touch-ups are anchored relative to the feature clouds 110, 111 of the physical objects in the scene, so their positions are instantly and accurately updated in real time as the end-user moves his or her phone or walks around the scene. Because the system also has machine learning classifiers which are able to categorize and identify objects, in this case it can provide basic information about the trees which were uploaded by the end-user, even if the system has never viewed the particular trees before.

In FIG. 4, the end-user walks around the scene to the left (i.e. clockwise) and sees landmarks 100, 101 from a different angle, all the while pointing his/her mobile device back at the location where the house is. The device's camera is now facing East 400. The device already has the SLAM-mapped scene in memory and dynamically recognizes and updates the feature clouds/3-D objects 110, 111. New additions to the scene which were not previously stored in the SLAM-Map Fabric are now also stored, effectively turning and end-user into a crowd-sourced data collector. As before, the end-user does not see the feature cloud on the screen, but it is used to constantly orient the scene and draw the virtual house 300 and the SLAM Trigger 301 in the correct positions and orientations relative to the end-user's new location. The end-user then walks up to the SLAM Trigger, which fires as soon as he/she is within its radius, thereby causing an arbitrary event programmed by the associated brand to occur.

Figure 5:
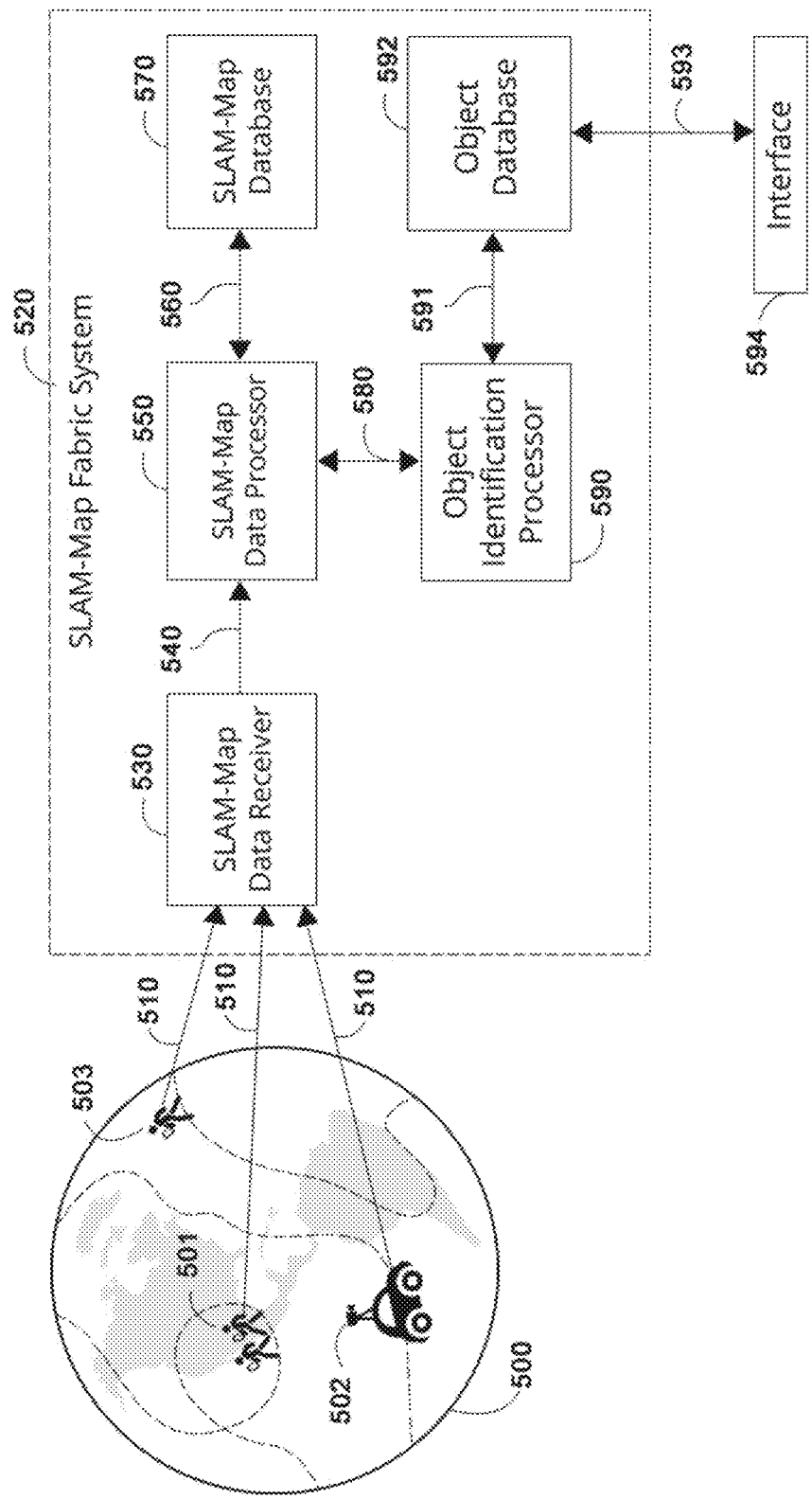
FIG. 5 is a block diagram of an overview of the architecture of a SLAM-Map Fabric that can be used in creating a SLAM Map as illustrated in FIG. 1.

FIG. 5 is a block diagram of an overview of the architecture of a SLAM-Map Fabric that can be used in creating a SLAM Map as illustrated in FIG. 1. The SLAM Map Fabric in this description can be understood as a server that is specially configured to receive and integrate data from a plurality of resources so as to provide a coherent model of the collective contributions that have been received and to make that model available to client devices, which may include mobile devices. FIG. 5 illustrates how the SLAM-Map Fabric 520 receives data from its client mapping applications in order to build its SLAM-Map model. As previously mentioned, the system's client applications can be deployed in a number of ways: The system can hire a team 501, crowd-source the problem to many unaffiliated individuals 503, mount cameras on vehicles 502, or receive them from end-users. In all of these cases, they explore the real world 500 and use the client software to build SLAM representations of their surroundings. These SLAM models, along with traditional location data such as GPS, wifi, and compass information are uploaded 510 to the system's SLAM-Map Data Receiver 530, which passes this information on to the SLAM-Map Data Processor 550 via 540. This Data Processor uses the GPS and compass information accompanying the SLAM model from the client to determine a first approximation where this scene is located and what its orientation should be. If GPS information is unavailable (for instance, if the SLAM model was created indoors or underground where GPS satellites were not visible to the client application, then the model's approximate location is determined by other means such as IP address lookup. The SLAM-Map Data Processor's other role is to parse the incoming scene to determine if it can identify any of the items or objects in it. It does this using common matching algorithms and heuristics such as grouping feature cloud clusters in which there is a high density of vertices, or by identifying planes and isolating objects protruding from them (such as a fire hydrant protruding from a flat sidewalk, or a car parked in the street). These objects, which themselves are smaller SLAM models, are conveyed via channel 580 to the system's Object Identification Processor 590, itself coupled via 591 with an Object Database 592. Using machine learning classifiers which differentiate and associate using SLAM models as well as other means such as color patterns, the Object Identification Processor attempts to match the incoming objects with similar objects in the database, and if a match is found, the object is used to further train the classifier and is then added to the database. Finally, an identifier for the object(s) as well as those of similar objects within the database are returned via 580 to the SLAM-Map Data Processor.

Once the SLAM-Map Data Processor has determined the model's approximate location, it queries the SLAM-Map Database 570, which contains both map and organizational information identifying object SLAM models, in order to determine if it is entering a new SLAM-mapped model for a location that wasn't previously in the system, or whether it is augmenting or modifying a location which has already been stored after having been partially mapped. If the location in question is entirely new in the system, then it is simply stored in the SLAM-Map Database 570 together with its object information and a relevant reference to the Object Database, if any. On the other hand, if it there are one or more similar locations already in the system, then the SLAM-Map Data processor fetches all of them from the SLAM-Map Database and tries to match the new location with them, using the traditional location information such as GPS, wifi, and compass information as guidance for a first approximation. Because of the unlikelihood that any two scenes in the real world would have any significant overlaps in their feature clouds, especially within the local area of the first approximation, the system has a high tolerance to noise, and partial matches are good enough to determine that a scene is the same as one which was previously mapped. If a match is found, then it stitches the models together, saves all relevant object information and Object Database references, and saves the overall result to the SLAM-Map Database. In some cases, a new model may cause several old models to be stitched together, and in this manner, the model in the database grows from fragments into a unified whole, until finally the whole world is modeled. Stitching is performed by determining exact alignment, and then performing standard matrix operations such as translations, rotations, and scaling, as necessary.

Similarly, it is possible that the area in which the new model falls has been largely or entirely mapped, in which case the system doesn't fetch the entire map and return it to the Data Processor. Instead, it returns only a fixed portion of the model which contains the new model. This is made easy because the SLAM-Map model is stored using a standard technique called "binary space partitioning" in which the world is divided into a "binary space tree". The root of the tree contains the entire world, and its children contain the hemispheres. Then each node has children, further dividing up the space. In the leaves of this tree are the actual SLAM-models. Because the height of the tree is logarithmic, accessing any particular model/location can be done very quickly.

Because the real world is ever-changing, the machine learning algorithms for matching new models to ones that were already stored need to have the ability to make matches despite a certain amount of noise, which is something that is well-understood in the technical literature. For instance, since trees lose their leaves and bloom at different times of the year, SLAM-models of a given tree could vary greatly if taken at different times. For this reason, the matching algorithm must be able to match models even if they are somewhat different. This isn't difficult because the majority of most scenes stay relatively static. Updating models therefore doesn't overwrite old features, but rather when matches are found, the differences are stored as well, thereby making future matches easier as well as providing a greater amount of data such as seasonal variations in our tree example.

As the system's Object Database grows, and as the SLAM-Map Database starts to receive several duplicated SLAM-Mappings of the same areas, the present embodiment periodically has the SLAM-Map Data Processor in conjunction with the Object Identification Processor revisit the main SLAM-Map in order to identify and classify objects which it may have previously missed. As before, this is done using machine learning classifiers, but a particularly easy case is to identify objects from scenes in which the object is present in one but not the other, thereby showing that it was not a permanent fixture.

For instance, if the SLAM-Map contains two overlaid maps of the same street taken at different times, then it is possible for one or more cars to be present in one, but absent in the other, making it trivial to identify, isolate, and categorize them as objects. These efforts are further improved by providing an interface 594 coupled via 593 with the Object Database 592. This interface allows trusted system administrators to upload 3-D models of various objects, including high-resolution 3-D models of various products along with identifying metadata such as names, manufacturers, SKU codes, etc. to the Object Database in order to provide it with a rich source of object information. This interface also provides an interactive component which shows a model to the administrator and asks if it has been correctly identified and categorized. As an example, the interface can show a fire hydrant and query the human operator as to whether it is a stump, in which case the operator would respond in the negative. At other times, the interface may show a car and query to verify that it is indeed a car, in which case the operator would respond in the affirmative. In addition, this interface can be used to associate additional metadata with identified objects. All of these human responses provide valuable training inputs to the system's machine learning classification training algorithms, and as the system classifies more and more objects in its map as being temporary rather than permanent fixtures, this also makes it progressively easier to match future incoming feature sets because it can ignore temporary objects (in the main map as well as the incoming feature cloud) for the purpose of matching.

In an alternative embodiment, client data can be processed on the server rather than locally in order to construct the local SLAM-Map. Instead of receiving pre-constructed SLAM-Map data from client devices 501, 502, and 503 over channel 510, the SLAM-Map Data Receiver 530 receives raw data in the form of camera images, video, LIDAR, RADAR, or other technological formats for mapping a three-dimensional space. The Data Receiver then performs the initial step of processing the raw data itself in order to construct a local SLAM-Map from the client data, and then proceeds as before.

In another alternative embodiment, a copy of the Object Database is stored or cached locally on the client, thereby giving it the ability to match and identify objects much more quickly. This Object Database can be routinely updated from a central source, if required.

Figure 6:
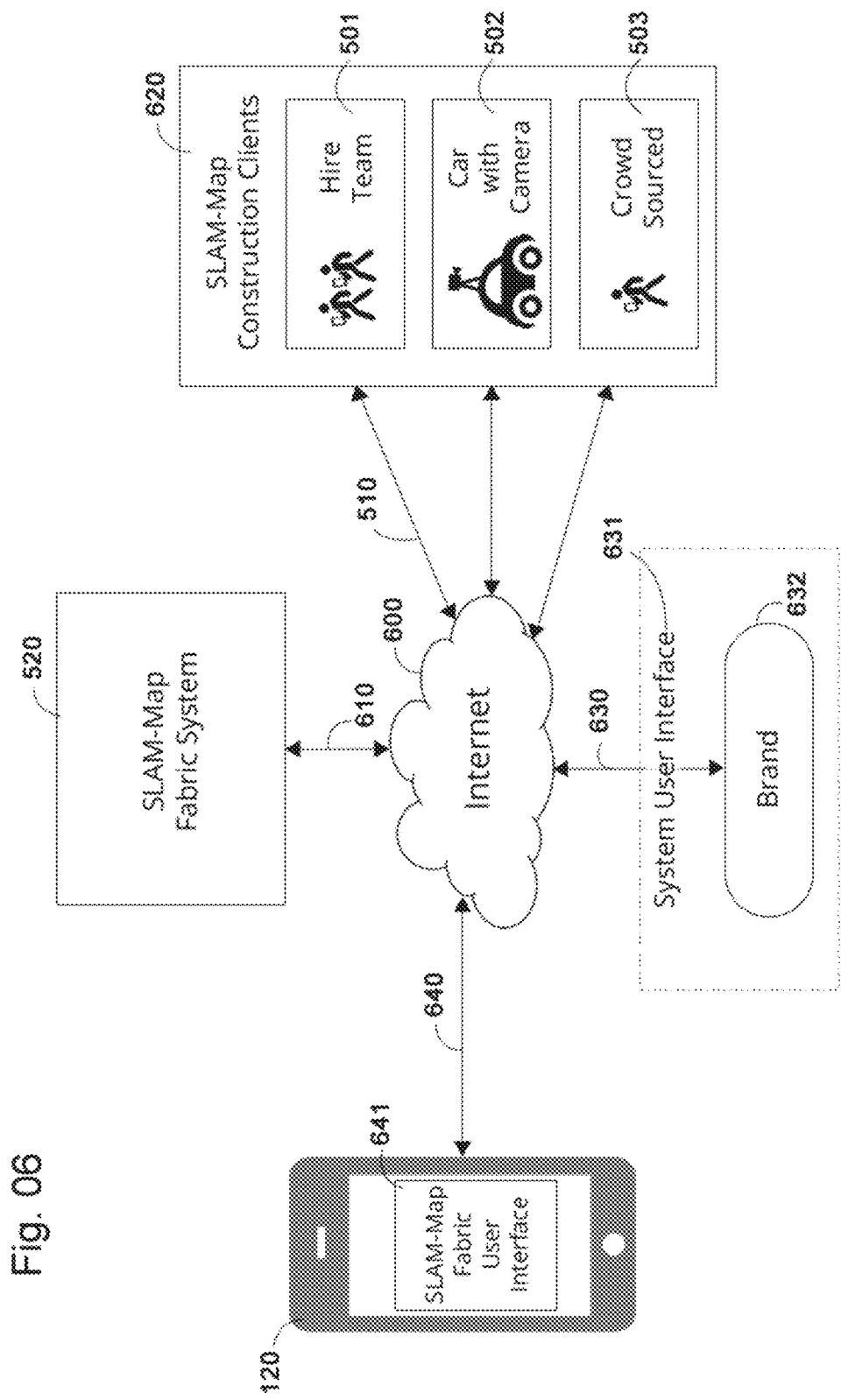
FIG. 6 is a block diagram illustrating the SLAM-Map Fabric system relative to its integration with the broader Internet.

FIG. 6 is a block diagram illustrating the SLAM-Map Fabric relative to its integration with the broader Internet. The SLAM-Map Fabric 520 is itself connected via the Internet 600, 610, 640 to the SLAM-Map Fabric User Interface 641, which is the software that resides in a third-party application (possibly from a brand) on an end-user's mobile device 120, which of course could be anything from a smart phone to computerized eyewear, to tablets, or any other portable computing device. It is this user interface which allows an end-user to experience the SLAM-Map as shown in FIGS. 2-4. The SLAM-Map Fabric is similarly connected to the System User Interface 631 over the Internet 600, 610, 630, where a brand or other entity can use a specific user interface 632 to create digital objects, graphical effects, videos, and SLAM Triggers in the virtual 3-D SLAM-Map world with which end-users will be able to interface. Finally, the SLAM-Map Construction Clients 620 are connected via the Internet 600, 610, 510 to the SLAM-Map Fabric. As already discussed, the SLAM-Map Construction Clients 620 include a team application client 501, a Street View-style car client 502, a crowd-source application 503, and end-user clients.

Figure 7:
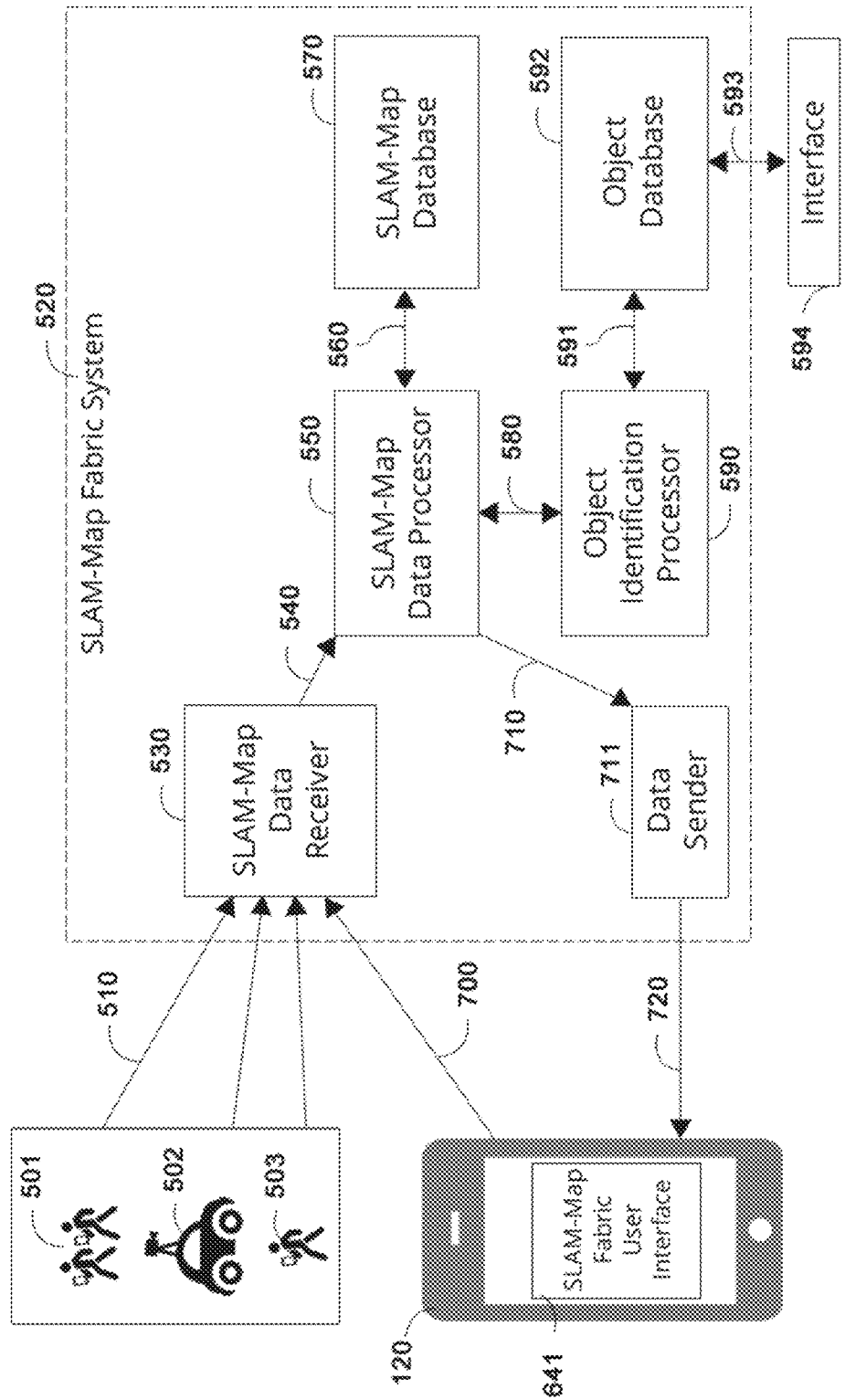
FIG. 7 is a more detailed block diagram of the architecture of the SLAM-Map Fabric system of FIG. 5.

FIG. 7 is a more detailed block diagram of the architecture of the SLAM-Map Fabric of FIG. 5. This diagram is similar to FIG. 5 except that it provides additional details. Whereas FIG. 5 illustrates the process of SLAM-map and object creation, FIG. 7 additionally illustrates the parts of the system dedicated to SLAM-map and object consumption. The SLAM-map creation clients 501, 502, 503, SLAM-Map Data Receiver 530, SLAM-MAP Data Processor 550, and SLAM-Map Database 570 have already been described within the context of SLAM-map creation. SLAM-map consumption is initiated using the SLAM-Map Fabric User Interface 641, operating on an end-user's mobile device 120. The end-user scans a real-world scene as previously described, and the client software on his/her device builds a SLAM model of this scene, which is then transmitted over the Internet 700 to the system's SLAM-Map Data Receiver 530 along with GPS and compass data. This model is passed via channel 540 to the SLAM-Map Data Processor 550, which retrieves nearby models and associated data such as augmented reality models, videos, SLAM Triggers, etc. from the SLAM-Mapping Database 570 via channel 560. The SLAM-Map Data Processor 550 then parses the scene to identify objects using the Object Identification Processor 590 and Object Database 592 via channels 580 and 591 respectively. The Data Processor 550 then attempts to match the model from the end-user's mobile device with the models which were just received from the SLAM-Map Database. If no match is found, then a response to that effect is sent via channel 710 to the Data Sender 711, and then via the Internet 720 to the SLAM-Map User Interface 641 on the end-user's mobile device 120. If a match is found, then the associated data, such as object information, augmented reality models, and SLAM Triggers as well as their relative positions to the model are sent via the same route to the SLAM-Map User Interface 641, where they are correctly displayed on the device as previously shown in FIGS. 3 and 4.

Another important use-case that is enabled by this SLAM-Map Fabric system, and not related to the consumption of virtual augmented reality, has to do with object identification. In this use-case, the user interface 641 can be used purely to identify objects in the real world. For instance, this could involve the end-user pointing his/her mobile device's camera at a particular make and model of car, and have the device respond by identifying it, including make, model, year, and so on. Similarly, it could be used to identify a consumer product and to then purchase it online. In this use-case, the interface 641 on the end-user's device sends a SLAM Map scene containing the object to the SLAM-Map Data Receiver 530 as before, with the additional information that the intent is to identify the object rather than to use the system's SLAM-Mapping service. The Data Receiver then passes the model via channel 540 to the SLAM-Map Data Processor 550, which processes the scene and isolates the models in it. These are sent via channel 580 to the Object Identification Processor 590, which via channel 591 attempts to determine a match with objects in the Object Database 592. If a match is found, the database responds with any information it has, such as the name, type of object, and SKU information, if applicable. For instance, the system could be used to recognize a famous statue or landmark, and to then provide historical or contextual information regarding it. Having identified the object(s), the Object Identification Processor 590 now passes this information via 580 to the Data Processor, and then via 710 to the Data Sender, which then sends it via 720 to the end-user's device, which can interpret that information according to the use-case for which it was designed. For instance, having identified the object(s) and received SKU data, it may send this to online shopping services such as Amazon.com or Google Shopping and allow the end-user to purchase the item(s) online, thereby enabling a seamless real-world mobile device-based shopping experience. Similarly, any piece of information or action can be associated with a specifically-identified object, in a sense turning identified objects into a type of primary key for data retrieval or invoking an action.

The presently-described embodiment of the SLAM-Map Fabric has considerable advantages over regular GPS-based mapping technology. Because it is based on having line-of-sight to satellites, GPS technology is inherently limited to the outdoors. It works very poorly indoors, and not at all when underground or in the core of a multi-level building. In addition, GPS-based location services are slow to load because they first need to receive information from several satellites, and even once they have locked onto them, GPS accuracy is extremely variable, at best getting the end-user to within a few meters. GPS location also constantly varies, so fine-grained location tends to "jump around" a lot. By contrast, the present embodiment of the SLAM-Map Fabric of the world is much more reliable in several different ways: It works in virtually all environments including indoors and underground. SLAM-Maps load far faster than GPS because they need not lock onto satellites, and they are also far more accurate; rather than having an accuracy of a few meters, their accuracy is on the order of a few centimeters, and does not jump around like GPS-based location services. Of course, SLAM technology also has its limitations, including the inability to work in totally dynamic environments, such as the open ocean where waves are constantly changing, but in that case mobile devices tend to lack reception in any event. In that sense, our SLAM-Map Fabric represents a "third layer" in positioning technology. The first layer involves techniques such as IP lookup. The second layer involves GPS, and the third layer is our system, thereby creating a series of progressively superior technologies for determining location. Because IP and GPS are used as a first approximation for determining location within our SLAM-Map Fabric, it is always guaranteed to be at least as accurate as these precursor technologies.

Similarly, the presently-described embodiment of the SLAM-based object identification service has considerable advantages over existing identification technologies such as Google Shopper, which currently depend on using mobile devices to scan bar codes and in some cases, packaging, since those methods will not work with objects that have been removed from their packaging, whereas the presently-described embodiment can do exactly this.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of providing a server-based feature cloud model of a realm, the method comprising:
   receiving by a server a series of digital contributions that collectively originate from a plurality of remote computing devices, each digital contribution characterizing a defined and distinct three-dimensional volume of the realm, wherein each distinct three-dimensional volume includes a portion that does not overlap any other three-dimensional volume;
   processing by the server of each one of the received digital contributions to associate such contribution with a global coordinate system; and
   storing and integrating each of the processed contributions in a realm model database so as to provide the feature cloud model of the realm stored on the server.

2. A method according to claim 1, wherein the contributions are in the form of feature clouds.

3. A method according to claim 1, wherein the contributions are in a form other than feature clouds, and processing by the server includes converting the contributions to feature clouds.

4. A computer-implemented method according to claim 1, further comprising:
   receiving a set of brand-based digital contributions of brand-based content for integration into the feature cloud model; and
   processing the received brand-based contributions to associate such brand-based contributions with the global coordinate system and storing and integrating each of the processed brand-based contributions in the realm model database so as to provide the feature cloud model of the realm stored on the server, so that one of the brand-based contributions can be experienced by an end-user, if the end-user is affiliated with the brand and if the brand-based contribution is located in the selected portion of the model.

5. A computer-implemented method according to claim 1, wherein an object database is coupled to the server, the method further comprising:
   storing, by the server, an association between a subset of feature cloud data in the feature cloud model of the realm and a selected one of the objects in the object database.

6. A computer-implemented method according to claim 5, further comprising:
   causing, by the server, the subset to be presented as part of a displayed view of a part of the feature cloud model of the realm, wherein the subset is identified using the association.

7. A computer-implemented method according to claim 5, further comprising:
   before storing the association, processing by the server of the subset of feature cloud data to determine the association.

8. A computer-implemented method according to claim 7, further comprising:
   receiving by the server a digital data set, wherein the digital data set contains object data, from a selected remote computing device;
   processing by the server the digital data set into a processed digital data set that is in a format compatible with the feature cloud model of the realm so as to facilitate a matching process;
   matching by the server, in the matching process, the processed digital data set with feature cloud data already stored in the feature cloud model of the realm to recognize an object encoded by the object data as corresponding to the selected one of the objects in the object database;
   retrieving the association between the selected one of the objects in the object database and a subset of the realm model corresponding to the object encoded by the processed digital data set; and
   transmitting to the selected remote computing device an identification of the association.

9. A computer-implemented method according to claim 5, wherein receiving by the server the series of digital contributions includes receiving a digital contribution from a given one of the remote computing devices in which the subset of feature cloud data is a part and is identified by the given computing device as a candidate for object processing and the method further comprises, before storing the association, processing by the server of the subset of feature cloud data to determine the association.

10. A computer-implemented method according to claim 5, wherein the realm is a domain.

11. A computer-implemented method according to claim 1, wherein the realm is a domain.

\* \* \* \* \*